United States Patent Office 3,591,556
Patented July 6, 1971

---

3,591,556
CURING AGENT COMBINATIONS OF SULFONAMIDES AND POLYOXYALKYLENE POLYAMINES FOR POLYEPOXIDES
Norman Bell Godfrey and Heinz Schulze, Austin, Tex., assignors to Jefferson Chemical Company, Inc., Houston, Tex.
No Drawing. Filed Sept. 30, 1968, Ser. No. 763,916
Int. Cl. C08g *30/14*
U.S. Cl. 260—47                        21 Claims

ABSTRACT OF THE DISCLOSURE

Epoxy resins from polyepoxides cured in the presence of amides of the formula $(RSO_2NH)_nR'$ and polyoxyalkylenepolyamines have fast and efficient low temperature cures and improved physical properties compared to epoxides cured with the amides alone or the polyoxyalkylenepolyamines alone. The cured epoxy resin compositions of this invention are useful plastics for coatings, castings, sealants and adhesives. Molds with improved physical properties are obtained using epoxy resins of this invention.

BACKGROUND OF THE INVENTION

Field of the invention

The invention pertains to the field of curing polyepoxides.

Description of the prior art

Polyoxyalkylenepolyamines and sulfonamides are known curing agents for epoxides. However, the coatings of epoxy resins cured with polyoxyalkylenepolyamines alone are slow to cure at room temperature and epoxy resins cured with sulfonamides alone do not cure at the low temperature cures of our invention because the sulfonamides are not soluble in the epoxy resin except when strongly heated. By using an amide with a polyoxyalkylenepolyamine as the combination curing agent of our invention, the reverse impact resistance of epoxy resin coatings improves as much as eightfold over the resins cured with a polyoxyalkylenepolyamine alone at room temperature.

The art of polyepoxide curing catalyst is discussed in Plastics Technology 12 37 (1966). The more common reactive hardeners are acid anhydrides and amines as taught by Urs., S. V., and Puglia, S.A., "Development of Flexible Epoxy Resins and Coatings," A.D.–645, 798, Dec., 1966, U.S. Govt. Res. Dev. Rep. 67 14, 99–100 (1967). The cure of epoxide-amine mixtures is improved by the addition of dodecenyl succinic anhydride as taught by U.S. Pat. 3,316,191 and amidines as taught by our co-pending application Ser. No. 750,008, filed Aug. 5, 1968. Sulfonamides or their formaldehyde condensation products are used as curing agents as taught by Lee & Neville, Handbook of Epoxy Resins, pp. 10–19, N.Y. (1967). Gough and Smith, J. Oil Colour Chemists Asso. 43, 409 (1960) report that benzenesulfonamide accelerates the cure of diglycidyl ether of isopropylidenediphenol by an amino-substituted imidazoline curing agent. The cure of epoxides at 150° C. is reported in U.S. Pat. 2,712,001. And German Pat. 1,076,366 describes the cure of epoxides by the sole action of sulfimides or of sulfonamides with reactive substituents, for example, sulfanilamide.

The fast, low temperature cures of our invention are especially advantageous in surface-coating applications, where heat curing is often impractical.

SUMMARY OF THE INVENTION

Polyepoxides cured with a combination curing agent—of (1) a polyoxalkylenepolyamine and (2) an amide of the formula $(RSO_2NH)_nR'$ wherein $n$ is 1 or 2, R is $NH_2$, alkenyl of 2 to 20 carbon atoms, alkyl of 1 to 20 carbon atoms, aryl, alkaryl, aralkyl, cycloalkyl of 3 to 12 carbon atoms, alkylamino of 1 to 20 carbon atoms, arylamino, alkarylamino, aralkylamino, cycloalkylamino of 3 to 12 carbon atoms, aminoaryl, aminoalkyl of 1 to 20 carbon atoms, aminocycloalkyl of 3 to 12 carbon atoms, aminoalkaryl, or aminoaralkyl and R' is H, alkyl, dialkylaminoalkyl, or cycloalkyl when $n$ is 1 or alkylene, oxydialkylene, thiodialkylene, polyoxyalkylene, or (alkyl)iminodialkylene when $n$ is 2—cure fast and efficiently at low temperatures and the cured resins have exceptional strength.

DESCRIPTION OF THE PREFERRED EMBODIMENTS

The invention is applicable to curable epoxy resins. The resins to which this invention is applicable are those polyepoxide organic compounds having an epoxy equivalency of greater than one, that is, compounds having an average of more than one epoxy group

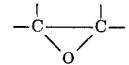

per molecule. These compounds, wherein the oxygen of the epoxy group is attached to vicinal carbon atoms, can be saturated or unsaturated, aliphatic, cycloaliphatic, or aromatic and can be substituted with substituents such as halogen atoms, alkyl groups, ether groups and the like.

Examples of the amides useful in our invention are sulfamide of the formula $NH_2SO_2NH_2$ which is not a known curing agent for epoxides, N,N'-trimethylenebis-p-toluenesulfonamide, N,N' - oxybis(trimethylene)bis-p-toluenesulfonamide, N,N' - thiodiethylenebis - methanesulfonamide, the bis-methanesulfony derivative of polyoxypropylenediamine-190, N,N' - [imino-bis(trimethylene)]bis - p - toluenesulfonamide of the formula $$HN(C_3H_6NHSO_2C_6H_4CH_3)_2$$

N,N'-[methyliminobis(trimethylene)] - bis - p - toluenesulfonamide, N,N' - [iminobis(trimethylene)] - bis - benzenesulfonamide, N,N' - (iminodiethylene)bis - p - toluenesulfonamide, sulfanilamide of the formula

cyclohexysulfamide of the formula

toluenesulfonamide, p-toluenesulfonamide of the formula

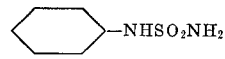

o-toluenesulfonamide, methanesulfonamide, cyclohexanesulfonamide, benzylsulfamide, vinylsulfonamide, methylsulfamide, α-toluenesulfonamide, N-(3 - dimethylaminopropyl)-p-toluenesulfonamide, or mixtures thereof. The amides of our invention are soluble in the polyoxyalkylenepolyamines. This combination is soluble in polyepoxides whereas the amides alone are not soluble.

Polyoxyalkylenepolyamines of the formula

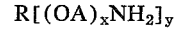

where R is a hydrocarbon radical, A is an alkylene radical of from 2 to 4 carbon atoms, $x$ has an average value from 1 to 10, and $y$ is an integer from 2 to 4, are useful in the practice of our invention. Polyoxypropylenepolyamines having a molecular weight of 190 to 1,000 are preferred for this invention. For example, polyoxypropylenediamines of the formula

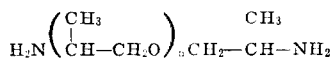

where $n$ is 2.4–2.6, 5.58, 15.91 and 33.13 are useful in the practice of our invention. Tripropyleneglycoldiamine of the formula

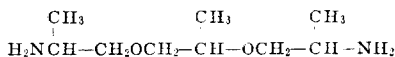

tetrapropyleneglycoldiamine of the formula

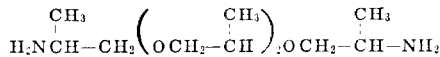

and polyoxypropylenetriamine of the formula

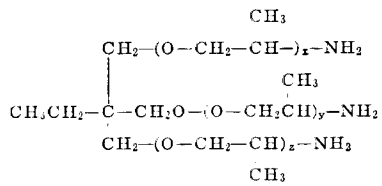

where $x+y+z=5.3$ are also examples of polyoxyalkylenepolyamines useful in the practice of our invention. Glycol polyamines prepared by cyanoalkylating a polyol and hydrogenating the product are further examples of useful polyoxyalkylenepolyamines in the practice of our invention.

Various formulations containing epoxides and curing agent combinations are illustrated in the examples and table below. The Sward Hardness Test reported in the examples is a standard American Society for Testing Materials (ASTM) test with the ASTM Designation D 1706. The reverse impact test reported in the examples is a standard test in the surface coating industry and is described by Gardner & Sward, Paint Testing Manual, 12th edition, p. 147, published by Gardner Laboratories, Bethesda, Md.

In the examples below, the number following the name of a polyoxyalkylene polyamine represents the approximate molecular weight of the compound.

EXAMPLE 1

Sulfamide (2 g.) was dissolved in polyoxypropylenediamine-190 with stirring and warming on a steam bath. The solution was mixed with 50 grams of a polyepoxide which was a diglycidyl ether of isopropylidenediphenol having an epoxy equivalent weight of 272. After about 30 minutes, the mixture gelled with a moderately high exotherm. Coating compositions were formulated as shown in Table I, below, and spread on carbon steel test panels with a 3-mil doctor blade. The time required for the panels to become dry to touch by the fingertips was noted. After 12 days, the panels of Samples 3 and 4 of Table I were bent through 180° around a conical mandrel of ⅛" narrow diameter. The coatings passed this test without cracking or separating from the steel backing.

TABLE I

| | Sample | | | |
|---|---|---|---|---|
| | 1 | 2 | 3 | 4 |
| Sulfamide, grams | 0.1 | 0.2 | 0.3 | 0.4 |
| Polyoxypropylenediamine-230, grams | 9.1 | 8.6 | 8.2 | 7.8 |
| Polyepoxide, grams | 25 | 25 | 25 | 25 |
| Set-to-touch time, hours | 6 | 5.5 | 5.5 | 4 |

EXAMPLE 2

A coating composition was formulated from 50 grams of a polyepoxide as used in Example 1, polyoxypropylenediamine-190 (10 g.), sulfamide (1 g.), xylene (5 g.), ethoxyethanol (5 g.), methyl isobutyl ketone (5 g.), and a silicon surfactant (0.5 g.). This coating was applied to steel panels by means of a 3-mil doctor blade and baked at 125° C. for 30 minutes. The panels were cooled to −70° C. or below and tested by the conical mandrel and reverse impact tests. The coating withstood the conical mandrel test and the reverse impact test at 160 in.-lb. even at this very low temperature.

Example 3 illustrates the poor reverse impact resistance of an epoxy resin cured four days at a low temperature containing only polyoxypropylenepolyamine as a curing agent and Examples IV and V illustrates the significant improvement using the curing agent combination of our invention.

EXAMPLE 3

A coating composition was formulated from 25 grams of a polyepoxide which was a diglycidyl ether of isopropylidenediphenol having an epoxy equivalent weight of 627, a mixed solvent composed of equal parts of toluene, methyl isobutyl ketone and ethoxyethanol (20 g.), a urea-formaldehyde resin as a flow-control agent (2 g. of 60% active) and polyoxypropylenediamine-230 (5 g.). A steel test panel was coated with this composition by means of a 3-mil application blade. After standing four days at about 25° C., the coated panel was tested for hardness, giving a Sward rating of 36. On testing for reverse impact resistance, the coating ruptured at a value of 20 in.-lb.

EXAMPLE 4

A coating composition was formulated and applied as in Example 3, except that in place of the polyoxypropylenediamine-230 alone, an equal amount of a solution of sulfanilamide in polyoxypropylenediamine-230 (1:5 by weight, respectively) was used as the curing agent. After 18 hours at about 25° C., the coating had a hardness rating of 42. After two days, it had a hardness of 46, and withstood a blow of 160 in.-lb. in the reverse impact test without visible damage, illustrating an eightfold improvement for reverse impact over the resin of Example 3.

EXAMPLE 5

A coating composition was formulated and applied as in Example 3, except that in place of the polyoxypropylenediamine-230 alone, an equal amount of a solution of p-toluenesulfonamide in polyoxypropylenediamine-230 (1:3 by weight, respectively), was used as the curing agent. After four days this coating had a Sward hardness rating of 50 and withstood a shock of 160 in.-lb. in the reverse impact test without visible damage, again illustrating an eightfold improvement for reverse impact over the resin of Example 3.

Comparable results to those in the examples and table, supra, are obtained with other combinations of polyepoxides, amides and polyoxyalkylenepolyamines of our invention which are not illustrated.

The amounts of the polyoxyalkylenepolyamide and amide to each other and to the polyepoxide may vary considerably without departing from the scope of our invention. For the preferred embodiment of the invention, the total number of equivalents of polyoxyalkylenepolyamine and amide combined should be within the range of from about 0.75 to 1.25 times the number of equivalents of epoxide present in the polyepoxide, and the number of equivalents furnished by the polyoxyalkylenepolyamine should lie within the range from about 50 to 95 percent of the total number of equivalents furnished by the polyoxyalkylenepolyamine and the amide combined. Or, the number of equivalents furnished by the amide should lie within the range from about 5 to 50 percent of the total number of equivalents furnished by the polyoxyalkylenepolyamine and the amide combined. For purposes of calculation, the equivalents of polyoxyalkylenepolyamine are equal to the mols of polyoxyalkylenepolyamine multiplied by twice the number of amino groups in the polyoxyalkylenepolyamine.

The preferred curing temperature for the epoxy resins of our invention is below 80° C.

We claim:

1. A method for curing a polyepoxypolyhydroxy ether resin which is a polyglycidyl ether of a polyhydric phenol having a 1,2-epoxy equivalency between 1 and 2 which comprises:

combining with the polyepoxypolyhydroxy ether resin
(1) one or more amides of the formula $$(RSO_2NH)_nR'$$

wherein $n$ is 1 or 2, R is $NH_2$, alkenyl of 2 to 20 carbon atoms, alkyl of 1 to 20 carbon atoms, aryl, alkaryl, aralkyl, cycloalkyl of 3 to 12 carbon atoms, alkylamino of 1 to 20 carbon atoms, arylamino, alkarylamino, aralkylamino, cycloalkylamino of 3 to 12 carbon atoms, aminoaryl, aminoalkyl of 1 to 20 carbon atoms, aminocycloalkyl of 3 to 12 carbon atoms, aminoalkaryl, or aminoaralkyl, and R' is H, alkyl of 1 to 20 carbon atoms, dialkylaminoalkyl or cycloalkyl of 3 to 12 carbon atoms when $n$ is 1, or alkylene, oxydialkylene, thiodialkylene, polyoxyalkylene or (alkyl)iminodialkylene when $n$ is 2 and
(2) a polyoxyalkylenepolyamine.

2. A method for curing an epoxy resin according to claim 1 wherein the total number of equivalents of amide and polyoxyalkylenepolyamine combined is within the range from about 0.75 to about 1.25 times the number of equivalents of epoxide present.

3. A method for curing an epoxy resin according to claim 2 wherein the number of equivalents furnished by the amide is within the range of from about 5 to about 50 percent of the total number of equivalents furnished by the polyoxyalkylenepolyamine and amide combined.

4. A method for curing an epoxy resin according to claim 3 wherein the combined elements are heated to a curing temperature of less than about 80° C.

5. A method for curing an epoxy resin according to claim 4 wherein R of the amide formula is $NH_2$, alkyl of 1 to 5 carbons atoms, aryl, alkaryl, alkylamino of 1 to 5 carbon atoms, cyclohexylamino, arylamino or alkarylamino, R' is H, alkyl of 1 to 5 carbon atoms or cyclohexyl and the polyoxyalkylenepolyamine is a polyoxypropylenepolyamine.

6. A method for curing an epoxy resin according to claim 4 wherein the amide is sulfamide, cyclohexylsulfamide, p - toluenesulfonamide, o - toluene sulfonamide, sulfanilamide, methanesulfonamide, N,N'-[methyliminobis(trimethylene)]-bis - p - toluenesulfonamide, or N,N'-[iminobis(trimethylene)] - bis-p-toluenesulfonamide and the polyoxyalkylenepolyamine is polyoxypropylenediamine-190.

7. A method for curing an epoxy resin according to claim 4 wherein the amide is sulfamide or cyclohexylsulfamide and the polyoxyalkylenepolyamine is polyoxypropylenediamine-190.

8. A method for curing an epoxy resin according to claim 4 wherein the amide is p-toluenesulfonamide, sulfanilamide, methanesulfonamide, N,N' - [methyliminobis(trimethylene)]-bis-p-toluensulfonamide or N,N'-[iminobis(trimethylene)]bis-p-toluenesulfonamide and the polyoxyalkylenepolyamine is polyoxypropylenediamine-190.

9. A curable epoxy resin composition which comprises: a polyepoxypolyhydroxy ether resin which is a polyglycidyl ether of a polyhydric phenol having a 1,2-epoxy equivalency between 1 and 2
one or more amides of the formula $(RSO_2NH)_nR'$ wherein $n$ is 1 or 2, R is $NH_2$, alkenyl of 2 to 20 carbon atoms, alkyl of 1 to 20 carbon atoms, aryl, alkaryl, aralkyl, cycloalkyl of 3 to 12 carbon atoms, alkylamino of 1 to 20 carbon atoms, arylamino, alkarylamino, aralkylamino, cycloalkylamino of 3 to 12 carbon atoms, aminoaryl, aminoalkyl of 1 to 20 carbon atoms, aminocycloalkyl of 3 to 12 carbon atoms, aminoalkaryl, or aminoaralkyl, and R' is H, dialkylaminoalkyl of 1 to 20 carbon atoms, or cycloakyl of 3 to 12 carbon atoms when $n$ is 1, or alkylene, oxydialkylene, thiodialkylene, polyoxyalkylene or (alkyl)-iminodialkylene when $n$ is 2, and
a polyoxyalkylenepolyamine.

10. A curable epoxy resin composition according to claim 9 wherein the total number of equivalents of amide and polyoxyalkylenepolyamine combined is within the range from about 0.75 to about 1.25 times the number of equivalents of epoxide present.

11. A curable epoxy resin composition according to claim 10 wherein the number of equivalents furnished by the amide is within the range of from about 5 to about 50 percent of the total number of equivalents furnished by the polyoxyalkylenepolyamine and amide combined.

12. A curable epoxy resin composition according to claim 11 wherein the combined elements are heated to a curing temperature of less than about 80° C.

13. A curable epoxy resin composition according to claim 12 wherein R is of the amide formula is $NH_2$, alkyl of 1 to 5 carbon atoms, aryl, alkaryl, alkylamino of 1 to 5 carbon atoms, cyclohexylamino, arylamino, or alkarylamino, R' is H, alkyl of 1 to 5 carbon atoms or cyclohexyl and the polyoxyalkylenepolyamine is a polyoxypropylenepolyamine.

14. A curable epoxy resin composition according to claim 12 wherein the amide is sulfamide, cyclohexysulfamide, p - toluene sulfonamide, o - toluenesulfonamide, sulfanilamide, methane sulfonamide, N,N'-[methyliminobis(trimethylene)]bis - p - toluenesulfonamide, or N,N'-[iminobis(trimethylene)]bis - p - toluenesulfonamide and the polyoxyalkylenepolyamine is polyoxypropylenediamine-190.

15. A curable epoxy resin composition according to claim 12 wherein the amide is sulfamide or cyclohexylsulfamide and the polyoxyalkylenepolyamine is polyoxypropylenediamine-190.

16. A curable epoxy resin composition according to claim 12 wherein the amide is p-toluenesulfonamide, sulfanilamide, methanesulfonamide, N,N'-[methylaminobis(trimethylene)]bis - p - toluenesulfonamide or N,N'-[iminobis(trimethylene)]bis - p - toluenesulfonamide and the polyoxyalkylenepolyamine is polyoxypropylenediamine-190.

17. A curing agent combination for a polyepoxypolyhydroxy resin which is a polyglycidyl ether of a polyhydric phenol having a 1,2-epoxy equivalency between 1 and 2 which comprises:

(1) one or more amides of the formula $(RSO_2NH)_nR'$ wherein $n$ is 1 or 2, R is $NH_2$, alkenyl of 2 to 20 carbon atoms, alkyl of 1 to 20 carbon atoms, aryl, alkaryl, aralkyl, cycloalkyl of 3 to 12 carbon atoms, alkylamino of 1 to 20 carbon atoms, arylamino, alkarylamino, aralkylamino, cycloalkylamino of 3 to 12 carbon atoms, aminoaryl, aminoalkyl of 1 to 20 carbon atoms, aminocycloalkyl of 3 to 12 carbon atoms, aminoalkaryl, or aminoaralkyl, and R' is H, dialkylaminoalkyl of 1 to 20 carbon atoms or cycloalkyl of 3 to 12 carbon atoms when $n$ is 1, or alkylene, oxydialkylene, thiodialkylene, polyoxyalkylene, or (alkyl)iminodialkylene when $n$ is 2, and
(2) a polyoxyalkylene polyamine.

18. A curing agent combination according to claim 17 wherein R of the amide formula is $NH_2$, alkyl of 1 to 5 carbon atoms, aryl, alkaryl, alkylamino of 1 to 5 carbon atoms, cyclohexylamino, arylamino or alkarylamino, R' is H, alkyl of 1 to 5 carbon atoms or cyclohexyl and the polyoxyalkylenepolyamine is a polyoxypropylenepolyamine.

19. A curing agent combination according to claim 17 wherein the amide is sulfamide, cyclohexylsulfamide, p-toluenesulfonamide, o-toluenesulfonamide, sulfanilamide, methanesulfonamide, N,N'-[methylaminobis(trimethylene)]-bis-p-toluenesulfonamide, or N,N'-[iminobis(trimethylene)]-bis-p-toluenesulfonamide and the polyoxyalkylenepolyamine is polyoxypropylenediamine-190.

20. A curing agent combination according to claim 17 wherein the amide is sulfamide or cyclohexylsulfamide and the polyoxyalkylenepolyamine is polyoxypropylenediamine-190.

21. A curing agent combination according to claim 17 wherein the amide is p - toluenesulfonamide, o - toluenesulfonamide, sulfanilamide, methanesulfonamide, N,N'-[methyliminobis(trimethylene)] - bis - p - toluenesulfonamide or N,N' - [iminobis-(trimethylene)]bis-p-toluenesulfonamide and the polyoxyalkylenepolyamine is polyoxypropylenediamine-190.

References Cited
UNITED STATES PATENTS

| | | | |
|---|---|---|---|
| 2,712,001 | 6/1955 | Greenlee | 260—47EpCN |
| 2,828,265 | 3/1958 | Van Strein | 260—2EpC |
| 2,955,101 | 10/1960 | Bruin et al. | 260—47EpC |
| 3,023,190 | 2/1962 | Damusis | 260—47EpCN |
| 3,277,050 | 10/1966 | Pettigrew | 260—47EpCN |
| 3,316,185 | 4/1967 | Reinking | 260—47EpCN |

HAROLD D. ANDERSON, Primary Examiner

T. E. PERTILLA, Assistant Examiner

U.S. Cl. X.R.

117—127, 161; 252—182